United States Patent
Li et al.

(10) Patent No.: US 11,037,005 B2
(45) Date of Patent: Jun. 15, 2021

(54) METHOD AND APPARATUS FOR IDENTIFYING TRAFFIC LIGHT

(71) Applicant: Baidu Online Network Technology (Beijing) Co., Ltd., Beijing (CN)

(72) Inventors: Ming Li, Beijing (CN); Tian Xia, Beijing (CN); Han Gao, Beijing (CN); Yuqiang Zhai, Beijing (CN); Shijia Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/049,026

(22) Filed: Jul. 30, 2018

(65) Prior Publication Data
US 2019/0087673 A1    Mar. 21, 2019

(30) Foreign Application Priority Data
Sep. 15, 2017    (CN) .......................... 201710831216.6

(51) Int. Cl.
*G06N 5/00*    (2006.01)
*G06K 9/00*    (2006.01)
(Continued)

(52) U.S. Cl.
CPC ....... *G06K 9/00825* (2013.01); *G05D 1/0088* (2013.01); *G05D 1/0246* (2013.01);
(Continued)

(58) Field of Classification Search
CPC .. G06K 9/00825; G06K 9/6265; G06N 20/00; G06N 3/0454; G06N 3/084;
(Continued)

(56) References Cited

U.S. PATENT DOCUMENTS

| 8,624,994 B2 | 1/2014 | Kaneda |
| 10,223,780 B2 * | 3/2019 | Tan ........................ G06N 3/084 |

(Continued)

FOREIGN PATENT DOCUMENTS

| CN | 106022232 A | 10/2016 |
| CN | 106650641 A | 5/2017 |

(Continued)

OTHER PUBLICATIONS

Maschetti, Sergio; Robust traffic lights detection on mobile devices for pedestrians with visual impairment, 2015, Elsevier, Computer Vision and Image Undersanding 148 (2016), p. 128.*

(Continued)

*Primary Examiner* — James M McPherson
*Assistant Examiner* — Tiffany P Ohman
(74) *Attorney, Agent, or Firm* — Nixon Peabody LLP

(57) ABSTRACT

The disclosure discloses a method and apparatus for identifying a traffic light. An embodiment of the method comprises: zooming a to-be-processed image acquired by an image acquisition device by at least one preset ratio to obtain at least one zoomed image; inputting the at least one zoomed image into a pre-trained convolutional neural network to obtain location information and category information of a traffic light corresponding to each zoomed image of the at least one zoomed image, wherein the convolutional neural network is used for retrieving location information and category information of a traffic light displayed in an image; and analyzing the obtained location information and category information to generate at least one candidate traffic light identification result, and fusing the generated candidate traffic light identification result to generate a traffic light identification result corresponding to the to-be-processed image. The embodiment improves the accuracy in identifying a traffic light.

17 Claims, 5 Drawing Sheets

(51) Int. Cl.
*G05D 1/00* (2006.01)
*G06N 5/04* (2006.01)
*G05D 1/02* (2020.01)
*G06K 9/62* (2006.01)
*G06N 3/08* (2006.01)
*G06N 20/00* (2019.01)
*G06N 3/04* (2006.01)
*G08G 1/0962* (2006.01)

(52) U.S. Cl.
CPC ......... *G06K 9/6265* (2013.01); *G06N 3/0454* (2013.01); *G06N 3/084* (2013.01); *G06N 5/046* (2013.01); *G06N 20/00* (2019.01); *G08G 1/09623* (2013.01); *G05D 2201/0213* (2013.01)

(58) Field of Classification Search
CPC .... G06N 5/046; G05D 1/0088; G05D 1/0246; G05D 2201/0213; G08G 1/00
USPC .......................................................... 701/28
See application file for complete search history.

(56) References Cited

U.S. PATENT DOCUMENTS

| | | | |
|---|---|---|---|
| 2014/0201126 A1* | 7/2014 | Zadeh | A61B 5/165 706/52 |
| 2018/0285664 A1* | 10/2018 | Satyakumar | G06K 9/00825 |
| 2018/0307925 A1* | 10/2018 | Wisniowski | G06K 9/00825 |

FOREIGN PATENT DOCUMENTS

| | | |
|---|---|---|
| CN | 106777874 A | 5/2017 |
| CN | 106991382 A | 7/2017 |
| WO | WO 2016/165082 A1 | 10/2016 |

OTHER PUBLICATIONS

Lecun, Yann; Gradient-Based Learing Applied to Document Recognition, Nov. 1998, Proceedings of the IEEE, vol. 86, No. 11, p. 2318-2319.*

* cited by examiner

METHOD AND APPARATUS FOR IDENTIFYING TRAFFIC LIGHT

CROSS-REFERENCE TO RELATED APPLICATIONS

This application claims priority to Chinese Patent Application No. 201710831216.6, filed with the State Intellectual Property Office of the People's Republic of China (SIPO) on Sep. 15, 2017, the content of which is incorporated herein by reference in its entirety.

TECHNICAL FIELD

The disclosure relates to the field of computer technology, specifically to the field of autonomous driving, and more specifically to a method and apparatus for identifying a traffic light.

BACKGROUND

An autonomous vehicle is a novel intelligent vehicle, also known as a "robotic car," accurately controls, calculates, and analyzes all parts of the vehicle mainly through an ECU (electronic control unit) to achieve fully automatic operation of the vehicle, and achieve the goal of the autonomous vehicle.

In order to ensure that an autonomous vehicle can pass intersections safely, the autonomous vehicle needs to detect and identify traffic lights, and to make appropriate decisions. The existing method usually identifies colors and shapes of traffic lights based on color space conversion. However, this method fails to consider lighting changes, weather conditions and the like, thereby frequently leading to false detection and missed detection situations, and resulting in a problem of low accuracy in identifying a traffic light.

SUMMARY

An object of an embodiment of the disclosure is to provide a method and apparatus for identifying a traffic light, to solve the technical problems mentioned in the background part.

In a first aspect, an embodiment of the disclosure provides a method for identifying a traffic light for an autonomous vehicle, the autonomous vehicle is equipped with an image acquisition device, and the method includes: zooming a to-be-processed image acquired by the image acquisition device by at least one preset ratio to obtain at least one zoomed image; inputting the at least one zoomed image into a pre-trained convolutional neural network to obtain location information and category information of a traffic light corresponding to each zoomed image of the at least one zoomed image, where the convolutional neural network is used for retrieving location information and category information of a traffic light displayed in an image; and analyzing the obtained location information and category information to generate at least one candidate traffic light identification result, and fusing the generated candidate traffic light identification result to generate a traffic light identification result corresponding to the to-be-processed image.

In some embodiments, the convolution neural network is obtained through following training: obtaining the convolution neural network through training using a machine learning method based on a preset image set, a preset regression loss function, a preset classification loss function and a backpropagation algorithm, where the regression loss function is used for characterizing a degree of difference between location information outputted by the convolutional neural network and a location of an area of a traffic light in an inputted image, and the classification loss function is used for characterizing a degree of difference between category information outputted by the convolutional neural network and a category of a traffic light in an inputted image.

In some embodiments, each preset image in the preset image set displays a traffic light, and each preset image in the preset image set carries a location annotation indicating a location of an area of the displayed traffic light and a category annotation indicating a category of the displayed traffic light.

In some embodiments, the obtaining the convolution neural network through training using a machine learning method based on a preset image set, a preset regression loss function, a preset classification loss function and a backpropagation algorithm includes: randomly initializing a parameter of a pre-established initial convolutional neural network using a Gauss distribution; executing following training: generating a training sample carrying an annotation based on the preset image set, the annotation containing location information and category information of a traffic light; inputting the training sample into the initial convolutional neural network for forward propagation layer by layer, to obtain the location information and the category information outputted by the initial convolutional neural network; determining a value of the preset regression loss function and a value of the preset classification loss function based on the obtained location information and category information, and the location information and the category information contained in the annotation; calculating a gradient of a parameter of each layer of the initial convolutional neural network layer by layer using a chain rule and a backpropagation algorithm, and based on a sum of the value of the regression loss function and the value of the classification loss function; and updating a parameter of the initial convolutional neural network based on the calculated gradient; determining a number of times of executing the training, and continuing, in response to determining the number of times of the executing the training being less than a first preset number of times, to execute the training of the initial convolutional neural network after updating the parameter; and performing statistics, in response to determining the number of times of the executing the training being equal to the first preset number of times, on a parameter obtained in a finally second preset number of times of executing the training, determining a target parameter, and replacing a parameter of the initial convolutional neural network with the target parameter to obtain a trained convolutional neural network, where the second preset number of times is less than the first preset number of times.

In some embodiments, the generating a training sample carrying an annotation based on the preset image set includes: randomly selecting a category in a preset category set and a size in a preset size set; retrieving a preset image carrying a category annotation corresponding to the selected category in a preset image set; zooming the retrieved preset image to enable a size of an area of a traffic light in the retrieved preset image to be identical or close to the selected size, and capturing the retrieved preset image with a preset length and a preset width, with the area of the traffic light as the center, to obtain a first captured image; determining a zooming ratio of zooming the retrieved preset image, and generating an annotation of the first captured image based on the zooming ratio, and a location annotation and a category annotation carried by the retrieved preset image; and generating a random number within a preset numerical range, and determining, in response to determining the retrieved random number being less than a preset value, the retrieved preset image and the first captured image as training samples, where the preset numerical range includes the preset value.

In some embodiments, the generating a training sample carrying an annotation based on the preset image set further includes: randomly capturing, in response to determining the random number being greater than or equal to the preset value, the retrieved preset image with the preset length and the preset width, to obtain a second captured image, and determining the retrieved preset image and the second captured image as training samples, where the second captured image carries a category annotation indicating the category being a background category.

In some embodiments, the category set includes: a background category set, a daytime red light category set, a daytime yellow light category set, a daytime green light category set, a daytime black light category set, a night red light category set, a night yellow light category set, and a night green light category set.

In some embodiments, the preset size set includes a plurality of sizes with heights respectively being different pixels, and the convolutional neural network is a fully convolutional network.

In a second aspect, an embodiment of the disclosure provides an apparatus for identifying a traffic light for an autonomous vehicle, the autonomous vehicle is equipped with an image acquisition device, and the apparatus includes: a zooming unit configured for zooming a to-be-processed image acquired by the image acquisition device by at least one preset ratio to obtain at least one zoomed image; an input unit configured for inputting the at least one zoomed image into a pre-trained convolutional neural network to obtain a candidate traffic light identification result containing location information and category information of a traffic light and corresponding to each zoomed image of the at least one zoomed image, where the convolutional neural network is used for characterizing correspondence between an image and a candidate traffic light identification result; and an fusion unit configured for fusing the obtained candidate traffic light identification result to generate a traffic light identification result corresponding to the to-be-processed image.

In some embodiments, the apparatus further includes: a training unit configured for obtaining the convolution neural network through training using a machine learning method based on a preset image set, a preset regression loss function, a preset classification loss function and a backpropagation algorithm, where the regression loss function is used for characterizing a degree of difference between location information outputted by the convolutional neural network and a location of an area of a traffic light in an inputted image, and the classification loss function is used for characterizing a degree of difference between category information outputted by the convolutional neural network and a category of a traffic light in an inputted image.

In some embodiments, each preset image in the preset image set displays a traffic light, and each preset image in the preset image set carries a location annotation indicating a location of an area of the displayed traffic light and a category annotation indicating a category of the displayed traffic light.

In embodiments, the training unit includes: an initialization module configured for randomly initializing a parameter of a pre-established initial convolutional neural network using a Gauss distribution; a training module configured for executing following training: generating a training sample carrying an annotation based on the preset image set, the annotation containing location information and category information of a traffic light; inputting the training sample into the initial convolutional neural network for forward propagation layer by layer, to obtain the location information and the category information outputted by the initial convolutional neural network; determining a value of the preset regression loss function and a value of the preset classification loss function based on the obtained location information and category information, and the location information and the category information contained in the annotation; calculating a gradient of a parameter of each layer of the initial convolutional neural network layer by layer using a chain rule and a backpropagation algorithm, and based on a sum of the value of the regression loss function and the value of the classification loss function; and updating a parameter of the initial convolutional neural network based on the calculated gradient; a first determining module configured for determining a number of times of executing the training, and continuing, in response to determining the number of times of the executing the training being less than a first preset number of times, to execute the training of the initial convolutional neural network after updating the parameter; and a statistic performing module configured for performing statistics, in response to determining the number of times of the executing the training being equal to the first preset number of times, on a parameter obtained in a finally second preset number of times of executing the training, determining a target parameter, and replacing a parameter of the initial convolutional neural network with the target parameter to obtain a trained convolutional neural network, where the second preset number of times is less than the first preset number of times.

In some embodiments, the training unit further includes: a selection module configured for randomly selecting a category in a preset category set and a size in a preset size set; a retrieval module configured for retrieving a preset image carrying a category annotation corresponding to the selected category in a preset image set; a capturing module configured for zooming the retrieved preset image to enable a size of an area of a traffic light in the retrieved preset image to be identical or close to the selected size, and capturing the retrieved preset image with a preset length and a preset width, with the area of the traffic light as the center, to obtain a first captured image; a generation module configured for determining a zooming ratio of zooming the retrieved preset image, and generating an annotation of the first captured image based on the zooming ratio, and a location annotation and a category annotation carried by the retrieved preset image; and a second determining module configured for generating a random number within a preset numerical range, and determining, in response to determining the retrieved random number being less than a preset value, the retrieved preset image and the first captured image as training samples, where the preset numerical range includes the preset value.

In some embodiments, the training unit further includes: a third determining module configured for randomly capturing, in response to determining the random number being greater than or equal to the preset value, the retrieved preset image with the preset length and the preset width, to obtain a second captured image, and determining the retrieved preset image and the second captured image as training samples, where the second captured image carries a category annotation indicating the category being a background category.

In some embodiments, the category set includes: a background category set, a daytime red light category set, a daytime yellow light category set, a daytime green light category set, a daytime black light category set, a night red light category set, a night yellow light category set, and a night green light category set.

In some embodiments, the preset size set includes a plurality of sizes with heights respectively being different pixels, and the convolutional neural network is a fully convolutional network.

In a third aspect, an embodiment of the disclosure provides an autonomous vehicle, including: one or more processors; an image acquisition device for acquiring an image; and a memory for storing one or more programs, where the one or more programs cause, when executed by the one or more processors, the one or more processors to implement the method for identifying a traffic light according to any one of the embodiments.

In a fourth aspect, an embodiment of the disclosure provides a computer readable storage medium storing a computer program therein, where the program implements, when executed by the processor, the method for identifying a traffic light according to any one of the embodiments.

The method and an apparatus for identifying a traffic light provided by the embodiments of the disclosure zoom a to-be-processed image by at least one preset ratio to obtain at least one zoomed image; input the obtained zoomed image into a pre-trained convolutional neural network to obtain a candidate traffic light identification result containing location information and category information of a traffic light and corresponding to each zoomed image, and finally fuse the obtained candidate traffic light identification result to generate a traffic light identification result corresponding to the to-be-processed image. Due to that the neural network may be trained using images of various lighting conditions and weather conditions, so that lighting changes, weather situation, and the like may be considered to reduce false detection and missed detection situations, thereby improving the accuracy in identifying a traffic light.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
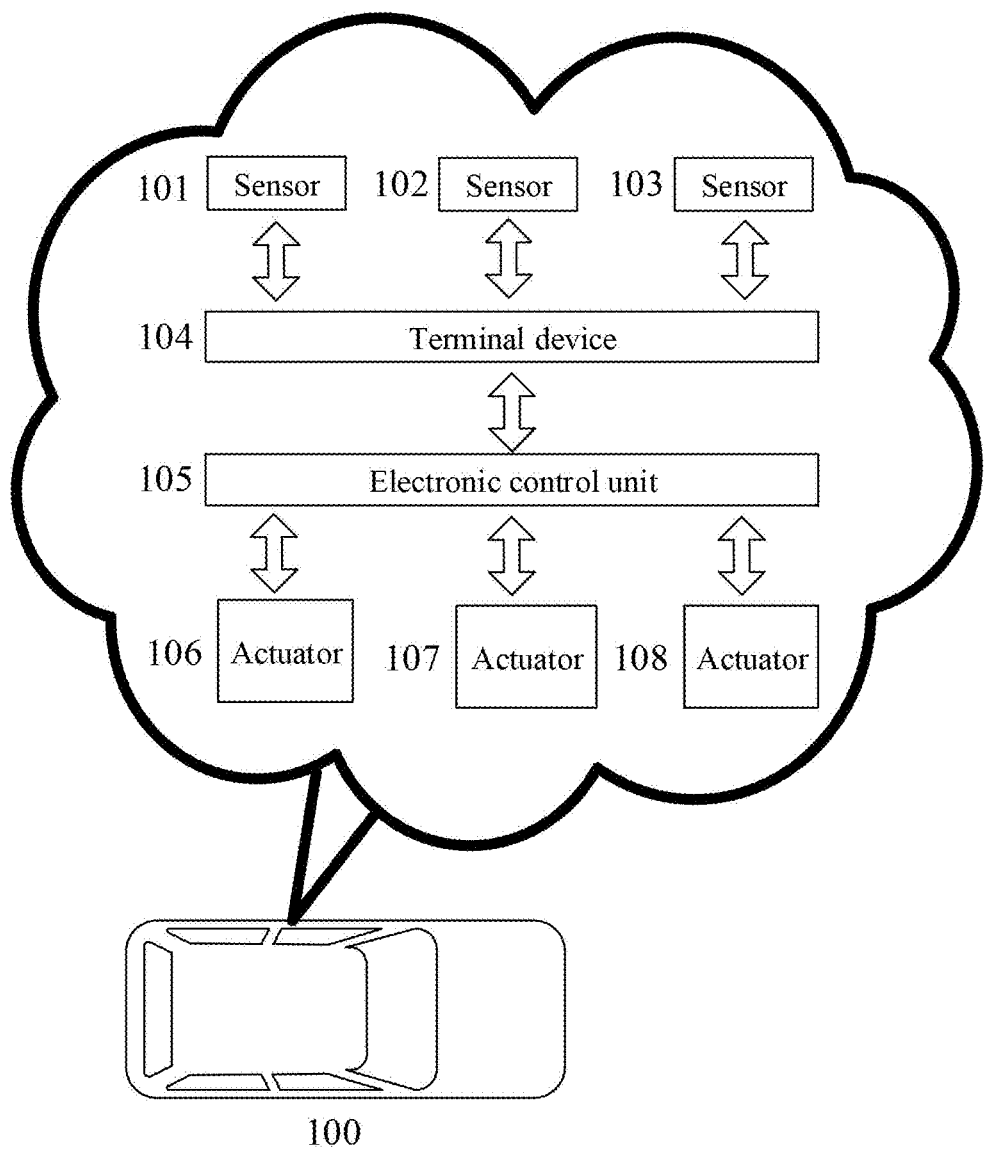
FIG. 1 is a structural diagram of an exemplary system in which the present disclosure may be implemented.

FIG. 1 shows an exemplary architecture of a system 100 in which a method for identifying a traffic light or an apparatus for identifying a traffic light according to the present disclosure may be applied.

As shown in FIG. 1, an autonomous vehicle 100 may be equipped with sensors 101, 102 and 103, a terminal device 104, an electronic control unit (ECU) 105 and actuators 106, 107 and 108.

The sensors 101, 102 and 103 may be in communication with the terminal device 104. The terminal device 104 may be in communication with the electronic control unit 105, and the electronic control unit 105 may be in communication with the actuators 106, 107 and 108. Here, the manner through which the terminal device 104 connects the electronic control unit 105 may be a CAN (controller area network) bus connection. The high performance and reliability of the CAN bus have been widely recognized. Therefore, at present, a commonly used vehicle bus in motor vehicles is the CAN bus. Of course, it should be appreciated that the vehicle bus may also be other bus types.

The sensors 101, 102 and 103 may encompass various sensors, for example, including but not limited to, an image acquisition device (e.g. a camera), a laser radar, a millimeter wave radar. Here, the image acquisition device may acquire images, while the laser radar may be used for self-positioning, collecting a surrounding environment, and the like. The millimeter wave radar refers to a radar that is capable of operating in a millimeter wave band, and may be used for detecting an obstacle. The camera may be used for identifying traffic lights, traffic signs, and the like.

The terminal device 104 may be responsible for overall intelligent control of the whole autonomous vehicle. The terminal device 104 may be a stand-alone controller, such as a programmable logic controller (PLC), a single blade machine, or an industrial control machine, it may also be another equipment having I/O ports and composed of electronic components with a computing and controlling function, and it may also be a computer device including an installed vehicle driving control application. The terminal device 104 may acquire data collected by the sensors 101, 102 and 103, analyze and process the acquired data, make appropriate decisions, and send instructions matching the decisions to the electronic control unit 105.

The electronic control unit 105 may also be known as a driving computer, on-board brain or driving computer etc. It usually includes a microprocessor, a memory, an I/O interface, an A/D converter, and a largescale fusion circuit, such as a shaping circuit and a driving circuit. The electronic control unit 105 may receive control instructions sent by the terminal device 104, analyze and process the control instructions, and send the processed control instructions to a corresponding actuator 106, 107 or 108 to execute corresponding operations.

In practice, the electronic control unit 105 may include controllers such as a vehicle control unit (VCU), a battery management system (BMS), a motor control unit (MCU), an electric power steering system (EPS), and an electronic stability program (ESP).

The actuators 106, 107 and 108 may operate according to the control parameters in the control instructions. The actuators 106, 107 and 108 may include a brake device, a throttle, an engine, and the like.

It should be noted that the method for identifying a traffic light according to the embodiments of the present disclosure is generally executed by the terminal device 104. Accordingly, the apparatus for identifying a traffic light is generally installed on the terminal device 104.

It should be appreciated that the numbers of the autonomous vehicles, the terminal devices, the sensors, the electronic control units and the actuators in FIG. 1 are merely illustrative. Any number of autonomous vehicles, terminal devices, sensors, electronic control units and actuators may be provided based on the actual requirements.

Figure 2:
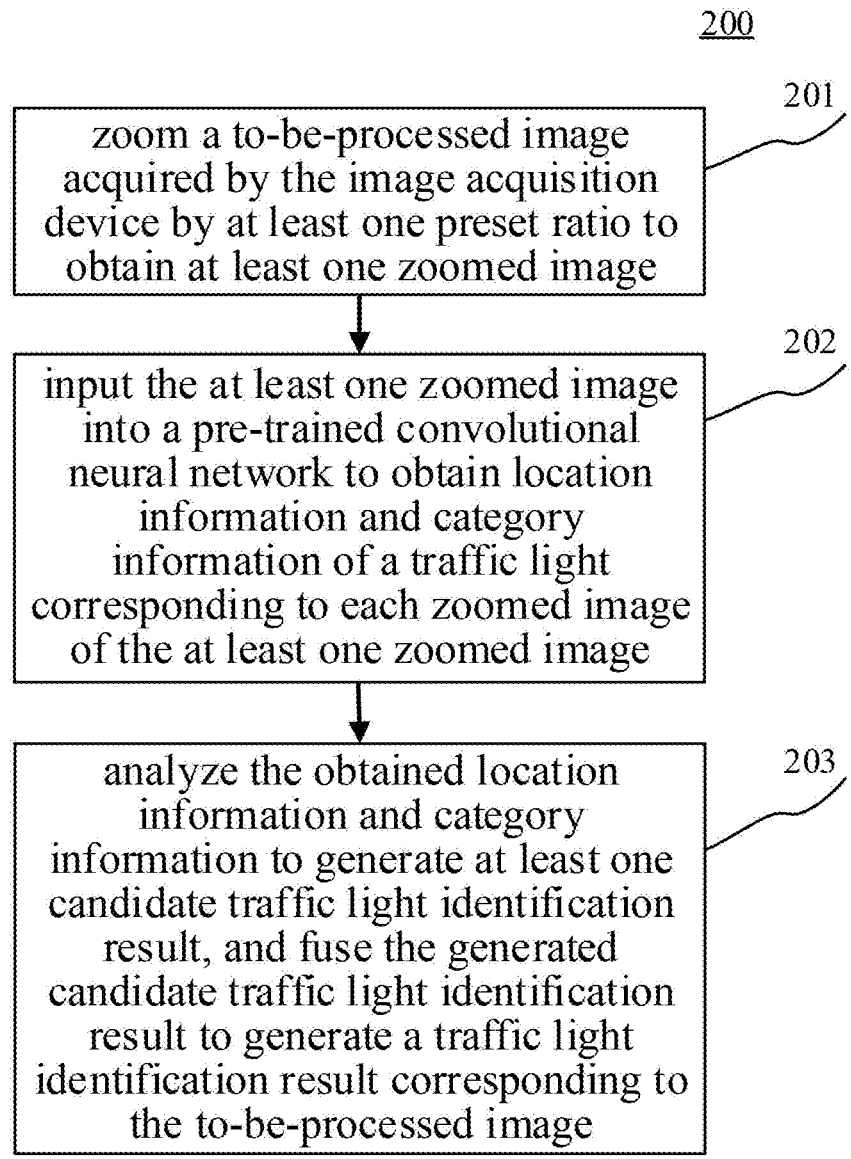
FIG. 2 is a flow chart of a method for identifying a traffic light according to an embodiment of the present disclosure.

Further referring to FIG. 2, a flow 200 of a method for identifying a traffic light for an autonomous vehicle according to an embodiment of the present disclosure is shown. The autonomous vehicle may be equipped with an image acquisition device, and the method for identifying a traffic light includes:

Step 201: zooming a to-be-processed image acquired by the image acquisition device by at least one preset ratio to obtain at least one zoomed image.

In the embodiment, an electronic device (for example, the terminal device 104 as shown in FIG. 1) in which the method for identifying a traffic light runs may zoom a to-be-processed image acquired by the image acquisition device by at least one preset ratio (for example, by four preset ratios: 1.5, 1.0, 0.5, 0.25) to obtain at least one zoomed image. Here, the zooming method may be a method of zooming according to the original image.

Step 202: inputting the at least one zoomed image into a pre-trained convolutional neural network to obtain location information and category information of a traffic light corresponding to each zoomed image of the at least one zoomed image.

In the present embodiment, the electronic device may input the at least one zoomed image into a pre-trained convolutional neural network to obtain location information and category information of a traffic light corresponding to each zoomed image of the at least one zoomed image. Here, the location information may be a coordinate (e.g., a coordinate of an upper left corner, a coordinate of a lower right corner, and the like) of an area of a traffic light in a zoomed image, and may also be an offset distance of a coordinate of an area of a traffic light in a zoomed image relative to a location of the to-be-detected image. The category information may include a probability of that a traffic light corresponds to each preset category (e.g., a color, a shape, or the like). As an example, the category information may include a probability of that a traffic light corresponds to each color category (e.g., red, yellow, green and black), a probability of that a traffic light corresponds to each color category in different environments (e.g. daytime, night, evening, early morning and afternoon), a probability of that a traffic light corresponds to each color category under different weather conditions (e.g., a sunny day, a rainy day, a snowy day and a foggy day), or the like. Furthermore, the category information may further include a probability of that a shape of a traffic light is a preset shape (e.g., a round cake shape or an arrow shape).

It should be noted that the convolutional neural network may include a plurality of convolutional layers for retrieving image features (it should be noted that the convolutional layer may also realize downsampling of inputted information). Here, the image features may include location information characterizing a location of a traffic light in an image, and may also include category information characterizing a category of a traffic light displayed in an image. In practice, the convolutional neural Network (CNN) is a feedforward neural network. Its artificial neuron may respond to peripheral units in a part of coverage, and has excellent performance for image processing. Thus, the convolutional neural network may be used for retrieving an image feature.

It should be noted that the convolutional neural network may be obtained through supervised training of an existing convolutional neural network structure (for example, Dense-Box, VGGNet, ResNet and SegNet) using a machine learning method based on a training sample. Here, the training sample may include a large number of images and annotations of each of the images, and the annotation of each image may include an annotation indicating a location of an area of a traffic light in the each image (e.g., a coordinate or an offset distance of a coordinate) and an annotation indicating a category (e.g., a color) of a traffic light in the each image. After inputting a zoomed image into a trained convolutional neural network, the convolutional neural network may output location information and category information corresponding to the zoomed image.

It should also be noted that either of the location information and the category information outputted by the convolutional neural network and corresponding to each zoomed image may be expressed by a matrix. As an example, for each zoomed image, location information of a traffic light in the each zoomed image may be expressed by 4 matrices, where the 4 matrices are respectively a matrix expressing an x-coordinate (or an offset distance of a coordinate) of an upper left corner of an area of the traffic light, a matrix expressing a y-coordinate (or an offset distance of a coordinate) of an upper left corner of an area of the traffic light, a matrix expressing an x-coordinate (or an offset distance of a coordinate) of a lower right corner of an area of the traffic light, and a matrix expressing a y-coordinate (or an offset distance of a coordinate) of a lower right corner of an area of the traffic light. It should be noted that for each image, a location of an area of a traffic light in each image may also be expressed by other number of matrices, which are not repeated any more here. In addition, for each zoomed image, a plurality of matrices may be used for expressing category information of a traffic light in the image. Each matrix of the plurality of matrices may correspond to a preset category, and each value in the matrix may be used for characterizing a probability of that an area corresponding to the value in the zoomed image corresponds to a preset category. Here, it should be noted that because the convolutional neural network downsamples an inputted content (i.e., the zoomed image), each value (corresponding to each point in an outputted image) in an outputted matrix expressing a category of a traffic light corresponds to an area of an inputted zoomed image.

In some optional implementations of the embodiment, the category information may include a probability of that a traffic light corresponds to each of following preset categories: a background category, a daytime red light category (i.e., a red traffic light in a daytime environment), a daytime yellow light category (i.e., a yellow traffic light in a daytime environment), a daytime green light category (i.e., a green traffic light in a daytime environment), a daytime black light category (i.e., a black traffic light in a daytime environment), a night red light category (i.e., a red traffic light in a night environment), a night yellow light category (i.e., a yellow traffic light in a night environment), and a night green light category (i.e., a green traffic light in a night environment).

Step 203: analyzing the obtained location information and category information to generate at least one candidate traffic light identification result, and fusing the generated candidate traffic light identification result to generate a traffic light identification result corresponding to the to-be-processed image.

In the present embodiment, the electronic device may firstly analyze the obtained location information and category information to generate at least one candidate traffic light identification result. Specifically, for each zoomed image, the electronic device may firstly retrieve a matrix outputted by the convolutional neural network and corresponding to each preset category with each zoomed image as input. Then, for a matrix corresponding to each preset category, the electronic device may compare each value in the matrix with a preset threshold to determine whether there is a value greater than the preset threshold in the matrix; and if there is a value greater than the preset threshold in the matrix, use the preset category as a target category, and determine a location of an area of a traffic light in the to-be-detected image corresponding to the value, i.e., a location of an area of a traffic light corresponding to the target category in the to-be-detected image, based on location information outputted by the convolutional neural network. Here, the electronic device may determine the target category and the location of the area of the traffic light of the target category as a candidate traffic light identification result. Therefore, for a matrix corresponding to each preset category, if there is a value greater than the preset threshold in the matrix, the electronic device may determine a candidate traffic light identification result. It should be noted that, if a candidate traffic light identification result is not determined after analyzing the location information and the category information of each zoomed image of the at least one zoomed image, then a candidate traffic light identification result indicating absence of a traffic light in the image may be generated. Therefore, the electronic device may determine at least one candidate traffic light identification result.

After generating the at least one candidate traffic light identification result, the electronic device may fuse the generated candidate traffic light identification result using various data processing methods, to generate a traffic light identification result corresponding to the to-be-processed image.

In some optional implementations of the present embodiment, for each determined target category, the electronic device may determine, in a candidate traffic light identification result, a public area of areas of traffic lights of the target category, and determine the target category and a location of the public area as a traffic light identification result corresponding to the to-be-processed image.

In some optional implementations of the embodiment, for each determined target category, the electronic device may determine, in a candidate traffic light identification result, a union set of areas of traffic lights of the target category, and determine a location of the union set as a traffic light identification result corresponding to the to-be-processed image.

In some optional implementations of the embodiment, the electronic device may also process the candidate traffic light identification result using a non-maximum suppression (NMS) algorithm When a gradient change is used for characterizing an edge, an area with a greater gradient change is usually wide; the non-maximum suppression algorithm may determine a normal direction using gradients in two directions, then determine, in the normal direction, whether a current gradient measurement is a peak (or a local maxima), retain same if the current gradient measurement is a maxima, and suppress same if the current gradient measurement is not a maxima (e.g., set as 0), thereby a location of an area of a traffic light in the to-be-detected image is more precisely determined. Here, the non-maximum suppression algorithm is a well-known technique widely researched and applied in the fields of target detection and location at present and is not repeated any more here.

Figure 3:
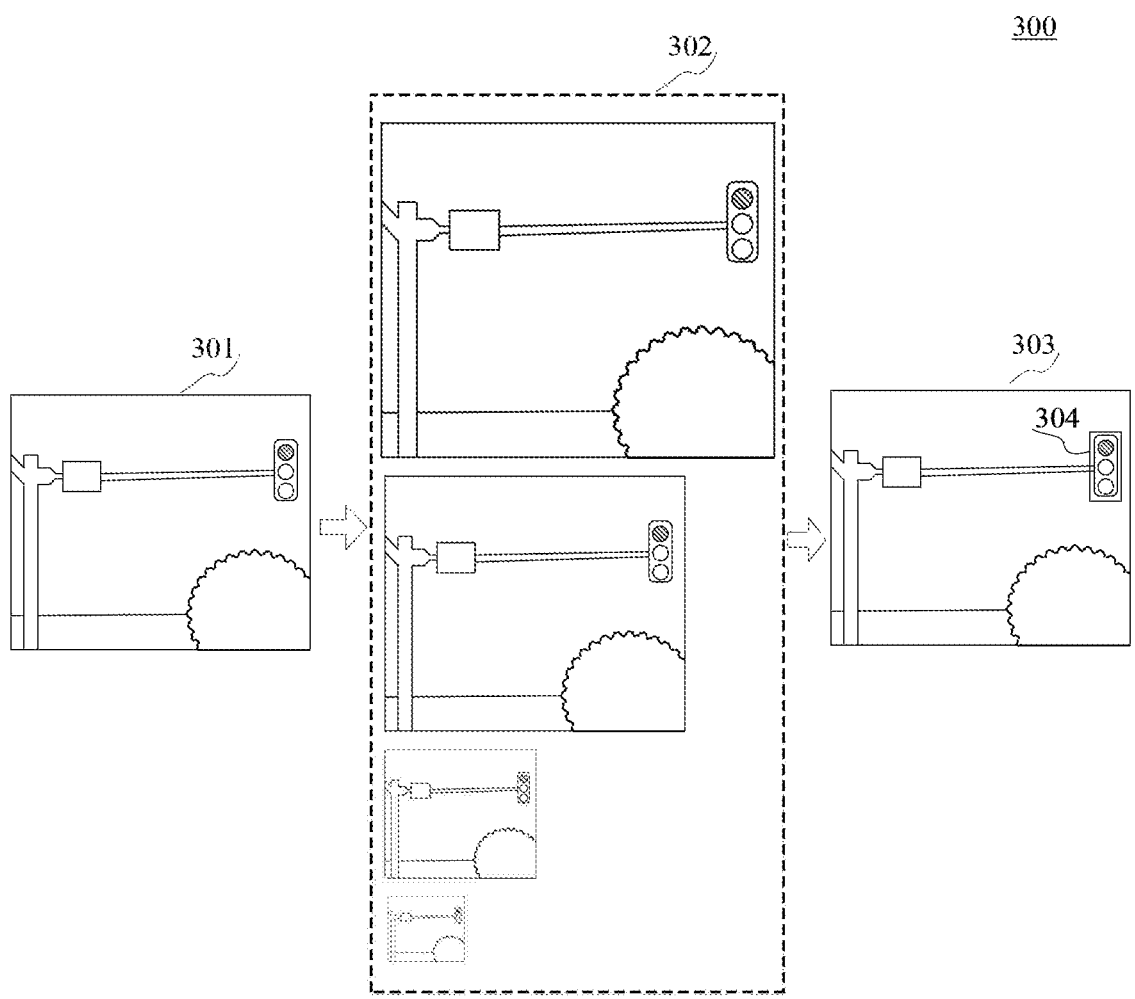
FIG. 3 is a schematic diagram of an application scenario of a method for identifying a traffic light according to the present disclosure.

Further referring to FIG. 3, FIG. 3 is a schematic diagram of an application scenario of a method for identifying a traffic light according to the embodiment. In the application scenario of FIG. 3, a terminal device of an autonomous vehicle firstly acquires a to-be-processed image 301 acquired by an image acquisition device installed in the autonomous vehicle; then, the terminal device zooms the to-be-processed image 301 by 4 preset ratios to obtain 4 zoomed images 302; subsequently, the terminal device inputs the 4 zoomed images into a pre-trained convolutional neural network to obtain location information and category information of a traffic light corresponding to the each zoomed image; and finally, the terminal device analyzes the obtained location information and category information to generate at least one candidate traffic light identification result, and fuses the generated candidate traffic light identification result to generate a traffic light identification result corresponding to the to-be-processed image. As represented by the reference number 303, a location of the rectangular box 304 is a location of a traffic light. It should be noted that a category of a traffic light may also be expressed by a color of the rectangular box 304.

The method provided by the embodiments of the disclosure zooms a to-be-processed image by at least one preset ratio to obtain at least one zoomed image; inputs the obtained zoomed image into a pre-trained convolutional neural network to obtain a candidate traffic light identification result containing location information and category information of a traffic light and corresponding to each zoomed image, and finally fuse the obtained candidate traffic light identification result to generate a traffic light identification result corresponding to the to-be-processed image. Due to that the neural network may be trained using images of various lighting conditions and weather conditions, so that lighting changes, weather situation, and the like may be considered to reduce false detection and missed detection situations, thereby improving the accuracy in identifying a traffic light.

Figure 4:
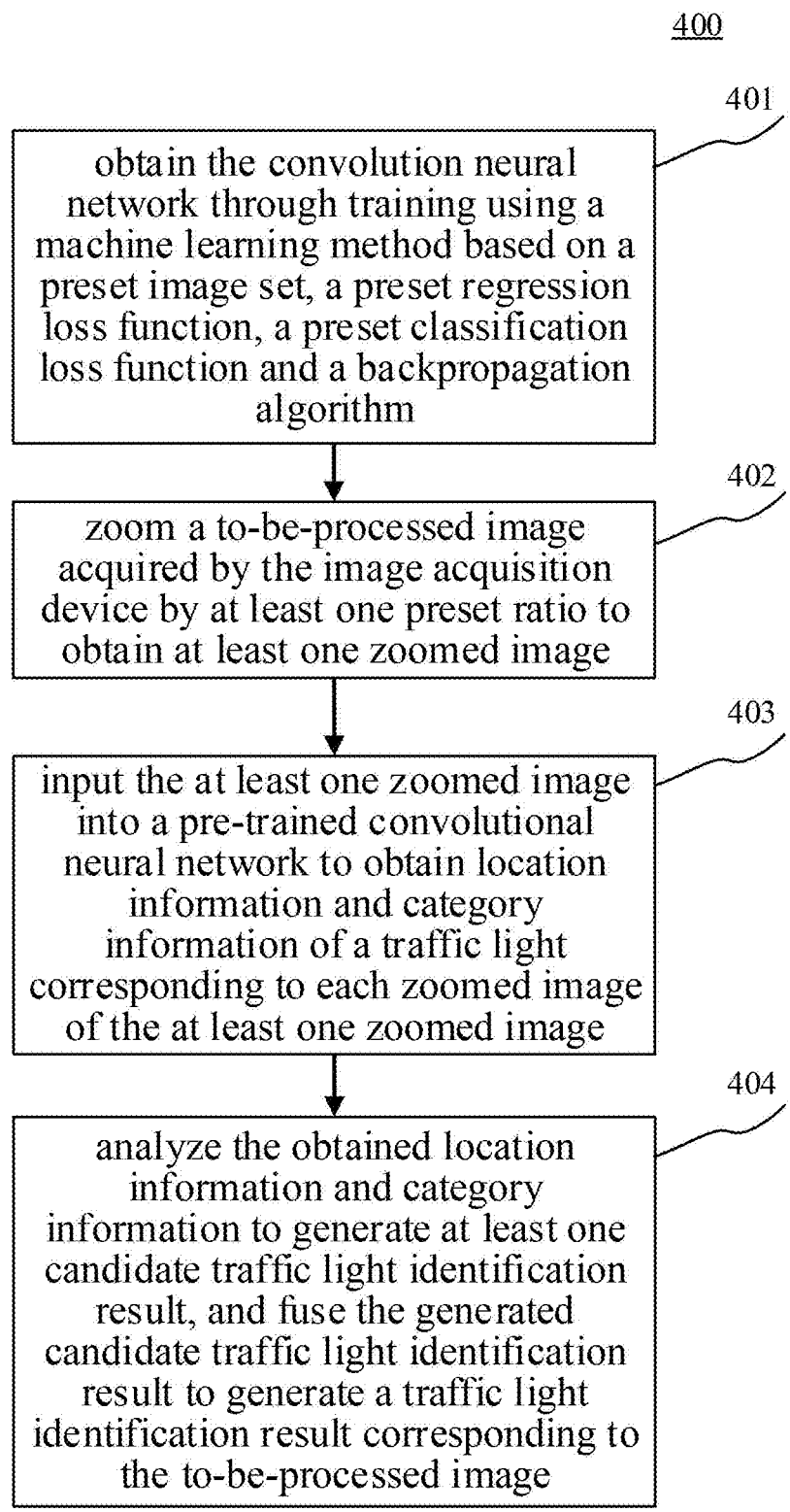
FIG. 4 is a flow chart of a method for identifying a traffic light according to another embodiment of the present disclosure.

Further referring to FIG. 4, a flow 400 of another embodiment of the method for identifying a traffic light is shown. The autonomous vehicle may be equipped with an image acquisition device, and a flow 400 of the method for identifying a traffic light includes:

Step 401: obtaining the convolution neural network through training using a machine learning method based on a preset image set, a preset regression loss function, a preset classification loss function and a backpropagation algorithm.

In the present embodiment, an electronic device (e.g., the terminal device 104 shown in FIG. 1) on which the method for identifying a traffic light runs may store a preset image set, and a preset image in the preset image set may carry various annotations. As an example, the annotations may include a location annotation indicating a location of an area of a displayed traffic light, a category annotation indicating a category of a displayed traffic light, an annotation indicating absence of a traffic light in a preset image, an annotation indicating a shape of a traffic light, and the like.

In the present embodiment, the electronic device may obtain the convolution neural network through training using a machine learning method based on a preset image set, a preset regression loss function, a preset classification loss function and a backpropagation algorithm, where the regression loss function is used for characterizing a degree of difference between location information outputted by the convolutional neural network and a location (i.e., location indicated by the location annotation) of an area of a traffic light in an inputted image, and the classification loss function is used for characterizing a degree of difference between category information outputted by the convolutional neural network and a category (i.e., category indicated by the category annotation) of a traffic light in an inputted image. In practice, the regression loss function may be a loss function for regression (e.g., Smooth L2 Loss function). The regression loss function may be a loss function for classification (e.g., Softmax function). It should be noted that, the electronic device may obtain the trained convolutional neural network through supervised training of an existing neural network structure (e.g., Inception structure) using a machine learning algorithm with a preset image in the preset image as input, and an annotation of the preset image as output. During training, the regression loss function and the classification loss function may constrain the way and direction that convolution kernel being modified, and an object of the training is to minimize a value of the regression loss function and a value of the classification loss function. Therefore, a parameter of a trained convolutional neural network is a parameter corresponding to a minimum sum of the value of the regression loss function and the value of the classification loss function.

In some optional implementations of the embodiment, the convolutional neural network may be a fully convolutional network (FCN). The fully convolutional network may include a plurality of convolutional layers, and may detect an area of traffic lights of a plurality of sizes.

In some optional implementations of the embodiment, the electronic device may obtain the convolutional neural network through following training:

Step I: a parameter of a pre-established initial convolutional neural network may be randomly initialized using a Gauss distribution. The Gaussian distribution is also known as a normal distribution. It should be noted that, the electronic device may also employ other method (e.g., random distribution) for random initialization, and employing the Gaussian distribution, the random distribution method, or the like for parameter initialization is a well-known technique, which is widely researched and applied at present, and is not repeated any more here.

Step II: following training may be executed:

Firstly, the electronic device may generate a training sample carrying an annotation based on the preset image set, the annotation containing location information and category information of a traffic light. As an example, the electronic device may process a preset image in the preset image set by zooming, adjusting a brightness, adjusting a contrast and so on to obtain more images, and use the preset image and the obtained image as training samples. It should be noted that, because the preset image carries an annotation, the electronic device may determine an annotation of a processed image based on a zooming ratio and an annotation carried by the preset image.

Then, the electronic device may input the training samples into the initial convolutional neural network for forward propagation layer by layer, to obtain location information and category information outputted by the initial convolutional neural network. Here, either of the location information and the category information outputted by the convolutional neural network may be expressed by a matrix.

Afterwards, the electronic device may determine a value of a preset regression loss function (e.g., Smooth L2 Loss function) and a value of a preset classification loss function (e.g., Softmax function) based on the obtained location information and category information, and the location information and the category information contained in the annotation of the training samples.

Finally, the electronic device may calculate a gradient of a parameter of each layer of the initial convolutional neural network layer by layer using a chain rule and a backpropagation algorithm (BP algorithm), and based on a sum of the value of the regression loss function and the value of the classification loss function, to update a parameter of the initial convolutional neural network based on the calculated gradient. In practice, the backpropagation algorithm may also be known as an error backpropagation (BP) algorithm. The BP algorithm consists of a signal forward propagation process and an error backpropagation process. In a feedforward network, an input signal is inputted through an input layer, calculated through a hidden layer, and outputted through an output layer. An output value is compared with a tagged value, and if there is an error, the error is back propagated from the output layer to the input layer, in which a neuron weight (e.g., a parameter of a convolution kernel in a convolutional layer) may be adjusted using a gradient descent algorithm. Here, the regression loss function and the classification loss function may be used for characterizing an error between the output value and the tagged value.

Step III: a number of times of the executing the training may be determined. The electronic device may continue, in response to determining the number of times of the executing the training being less than a first preset number of times (e.g., 100000 times or 140000 times), to execute the training of the initial convolutional neural network after updating the parameter; and the electronic device may perform statistics, in response to determining the number of times of the executing the training being equal to the first preset number of times, on the parameters obtained in the finally second preset number of times (e.g., 10000 times) of executing the training, determine a target parameter (e.g., get the average value), and replace a parameter of the initial convolutional neural network with the target parameter to obtain a trained convolutional neural network, where the second preset number of times is less than the first preset number of times.

In some optional implementations of the present embodiment, the electronic device may further generate a training sample carrying an annotation through:

Step I: a category in a preset category set and a size in a preset size set may be randomly selected. Here, a category in the category set may include: a background category, a daytime red light category, a daytime yellow light category, a daytime green light category, a daytime black light category, a night red light category, a night yellow light category, and a night green light category. The size set may include a plurality of sizes with heights respectively being different pixels (e.g., sizes with heights respectively being 16 pixels, 24 pixels, 32 pixels and 40 pixels). It should also be noted that categories in the category set may also be categorized in other ways (e.g., categorized into a red light category, a green light category, and a yellow light category), and the plurality of sizes may also be categorized using other pixels or in other ways (e.g., width respectively being 8 pixels, 16 pixels, and 32 pixels), which are not limited here.

Step II: a preset image carrying a category annotation corresponding to the selected category in a preset image set may be retrieved. As an example, the electronic device selects a category of a daytime red light category, and selects a size of 32 pixels, and then the electronic device may retrieve a preset image carrying a category annotation indicating a daytime red light category in the preset image set.

Step III: the retrieved preset image may be zoomed to enable a size of an area of a traffic light in the retrieved preset image to be identical or close to the selected size (i.e., a height being 32 pixels), and the retrieved preset image may be captured with a preset length (e.g., 192 pixels) and a preset width (e.g., 192 pixels), with the area of the traffic light as the center, to obtain a first captured image.

Step IV: a zooming ratio of zooming the retrieved preset image in the step III may be determined, and an annotation of the first captured image may be generated based on the zooming ratio, and the location annotation and the category annotation carried by the retrieved preset image. Here, location information, size information and the like of the area of the traffic light may be determined based on the location annotation carried by the retrieved preset image, after zooming with the area as the center, the size of the area of the traffic light in the first captured image may be determined based on the zooming ratio and the original size, and then the annotation of the first captured image may be obtained. It should be noted that the annotation of the first captured image further contains the category annotation of the retrieved preset image.

Step V: a random number within a preset numerical range (e.g., [0,1] interval) may be generated, and the retrieved preset image and the first captured image may be determined as training samples in response to determining the retrieved random number being less than a preset value (e.g., 0.5), where the preset numerical range may include the preset value. Furthermore, in response to determining the random number being greater than or equal to the preset value, the retrieved preset image is randomly captured with the preset length and the preset width, to obtain a second captured image, and the retrieved preset image and the second captured image are determined as training samples, where the second captured image carries a category annotation indicating the category being a background category.

Step 402: zooming a to-be-processed image acquired by the image acquisition device by at least one preset ratio to obtain at least one zoomed image.

In the present embodiment, the electronic device may zoom a to-be-processed image acquired by the image acquisition device by at least one preset ratio (for example, by four preset ratios: 1.5, 1.0, 0.5, 0.25) to obtain at least one zoomed image. Here, the zooming method may be a method of zooming according to the original image.

Step 403: inputting the at least one zoomed image into a pre-trained convolutional neural network to obtain location information and category information of a traffic light corresponding to each zoomed image of the at least one zoomed image.

In the present embodiment, the electronic device may input the at least one zoomed image into a pre-trained convolutional neural network to obtain location information and category information of a traffic light corresponding to each zoomed image of the at least one zoomed image. Here, the location information may be an offset distance of a coordinate of an area of a traffic light in a zoomed image relative to a location of the to-be-detected image. The category information may include a probability of that a traffic light corresponds to a category in the preset category set.

Step 404: analyzing the obtained location information and category information to generate at least one candidate traffic light identification result, and fusing the generated candidate traffic light identification result to generate a traffic light identification result corresponding to the to-be-processed image.

In the present embodiment, the electronic device may firstly analyze the obtained location information and category information to generate at least one candidate traffic light identification result. Then, the generated candidate traffic light identification result may be fused using a non-maximum suppression algorithm, to generate a traffic light identification result corresponding to the to-be-processed image.

It should be noted that operations in the step 402 to the step 404 are basically identical to those in the steps 201-203, and are not repeated any more here.

As can be seen from FIG. 4, compared with the embodiment corresponding to FIG. 2, a flow 400 of a method for identifying a traffic light according to the embodiment highlights training a convolutional neural network and generating a training sample. Therefore, the solution described in the present embodiment may identify and detect a traffic light using a superior training sample and model, thereby further improving the accuracy in identifying a traffic light.

Figure 5:
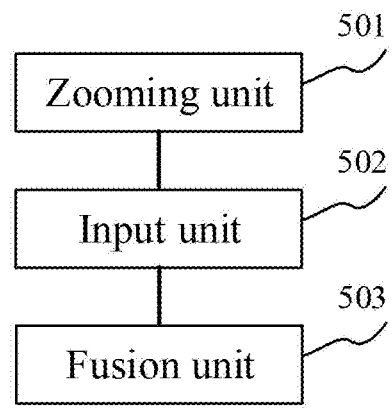
FIG. 5 is a schematic structural diagram of an apparatus for identifying a traffic light according to an embodiment of the present disclosure.

Further referring to FIG. 5, as implementations of the methods shown in the above figures, the present disclosure provides an embodiment of an apparatus for identifying a traffic light. The embodiment of the apparatus corresponds to the embodiment of the method shown in FIG. 2, and the apparatus may be applied in a variety of electronic devices.

As shown in FIG. 5, an apparatus 500 for identifying a traffic light according to the present embodiment includes: a zooming unit 501 configured for zooming a to-be-processed image acquired by the image acquisition device by at least one preset ratio to obtain at least one zoomed image; an input unit 502 configured for inputting the at least one zoomed image into a pre-trained convolutional neural network to obtain location information and category information of a traffic light corresponding to each zoomed image of the at least one zoomed image, where the convolutional neural network is used for retrieving location information and category information of a traffic light displayed in an image; and an fusion unit 503 configured for analyzing the obtained location information and category information to generate at least one candidate traffic light identification result, and fusing the generated candidate traffic light identification result to generate a traffic light identification result corresponding to the to-be-processed image.

In the present embodiment, the zooming unit 501 may zoom a to-be-processed image acquired by the image acquisition device by at least one preset ratio to obtain at least one zoomed image.

In the present embodiment, the input unit 502 may input the at least one zoomed image into a pre-trained convolutional neural network to obtain location information and category information of a traffic light corresponding to the each zoomed image of the at least one zoomed image.

In the embodiment, the fusion unit 503 may firstly analyze the obtained location information and category information to generate at least one candidate traffic light identification result; then, fuse the generated candidate traffic light identification result using a non-maximum suppression algorithm, to generate a traffic light identification result corresponding to the to-be-processed image.

In some optional implementations of the present embodiment, the apparatus 500 for identifying a traffic light may further include a training unit (not shown in the figure). Here, the training unit may be configured for obtaining the convolution neural network through training using a machine learning method based on a preset image set, a preset regression loss function, a preset classification loss function and a backpropagation algorithm, where the regression loss function is used for characterizing a degree of difference between location information outputted by the convolutional neural network and a location of an area of a traffic light in an inputted image, and the classification loss function is used for characterizing a degree of difference between category information outputted by the convolutional neural network and a category of a traffic light in an inputted image.

In some optional implementations of the present embodiment, each preset image in the preset image set may display a traffic light, and each preset image in the preset image set may carry a location annotation indicating a location of an area of the displayed traffic light and a category annotation indicating a category of the displayed traffic light.

In some optional implementations of the present embodiment, the training unit may include: an initialization module, a training module, a first determining module and a statistics performing module (not shown in the figure). Here, the initialization module may be configured for randomly initializing a parameter of a pre-established initial convolutional neural network using a Gauss distribution. The training module may be configured for executing following training: generating a training sample carrying an annotation based on the preset image set, the annotation containing location information and category information of a traffic light; inputting the training sample into the initial convolutional neural network for forward propagation layer by layer, to obtain the location information and the category information outputted by the initial convolutional neural network; determining a value of the preset regression loss function and a value of the preset classification loss function based on the obtained location information and category information, and the location information and the category information contained in the annotation; calculating a gradient of a parameter of each layer of the initial convolutional neural network layer by layer using a chain rule and a backpropagation algorithm, and based on a sum of the value of the regression loss function and the value of the classification loss function; and updating a parameter of the initial convolutional neural network based on the calculated gradient. The first determining module may be configured for determining a number of times of executing the training, and continuing, in response to determining the number of times of the executing the training being less than a first preset number of times, to execute the training of the initial convolutional neural network after updating the parameter. The statistics performing module may be configured for performing statistics, in response to determining the number of times of the executing the training being equal to the first preset number of times, on the parameters obtained in a finally second preset number of times of executing the training, determining a target parameter, and replacing a parameter of the initial convolutional neural network with the target parameter to obtain a trained convolutional neural network, where the second preset number of times is less than the first preset number of times.

In some optional implementations of the present embodiment, the training unit may further include: a selection module, a retrieval module, a capturing module, a generation module and a second determining module (not shown in the figure). Here, the selection module may be configured for randomly selecting a category in a preset category set and a size in a preset size set. The retrieval module may be configured for retrieving a preset image carrying a category annotation corresponding to the selected category in a preset image set. The capturing module may be configured for zooming the retrieved preset image to enable a size of an area of a traffic light in the retrieved preset image to be identical or close to the selected size, and capturing the retrieved preset image with a preset length and a preset width, with the area of the traffic light as the center, to obtain a first captured image. The generation module may be configured for determining a zooming ratio of zooming the retrieved preset image, and generating an annotation of the first captured image based on the zooming ratio, and a location annotation and a category annotation carried by the retrieved preset image. The second determining module may be configured for generating a random number within a preset numerical range, and determining, in response to determining the retrieved random number being less than a preset value, the retrieved preset image and the first captured image as training samples, where the preset numerical range includes the preset value.

In some optional implementations of the present embodiment, the training unit may further include: a third determining module (not shown in the figure). Here, the third determining module may be configured for randomly capturing, in response to determining the random number being greater than or equal to the preset value, the retrieved preset image with the preset length and the preset width, to obtain a second captured image, and determining the retrieved preset image and the second captured image as training samples, where the second captured image carries a category annotation indicating the category being a background category.

In some optional implementations of the present embodiment, the category set may include: a background category set, a daytime red light category set, a daytime yellow light category set, a daytime green light category set, a daytime black light category set, a night red light category set, a night yellow light category set, and a night green light category set.

In some optional implementations of the present embodiment, the preset size set may include a plurality of sizes with heights respectively being different pixels, and the convolutional neural network may be a fully convolutional network.

In an apparatus provided by the embodiment of the present disclosure, a zooming module 501 zooms a to-be-processed image by at least one preset ratio to obtain at least one zoomed image; then an input module 502 inputs the obtained zoomed image into a pre-trained convolutional neural network to obtain a candidate traffic light identification result containing location information and category information of a traffic light and corresponding to each zoomed image, and finally an fusion module 503 fuses the obtained candidate traffic light identification result to generate a traffic light identification result corresponding to the to-be-processed image. Due to that the neural network may be trained using images of various lighting conditions and weather conditions, so that lighting changes, weather situation, and the like may be considered to reduce false detection and missed detection situations, thereby improving the accuracy in identifying a traffic light.

Figure 6:
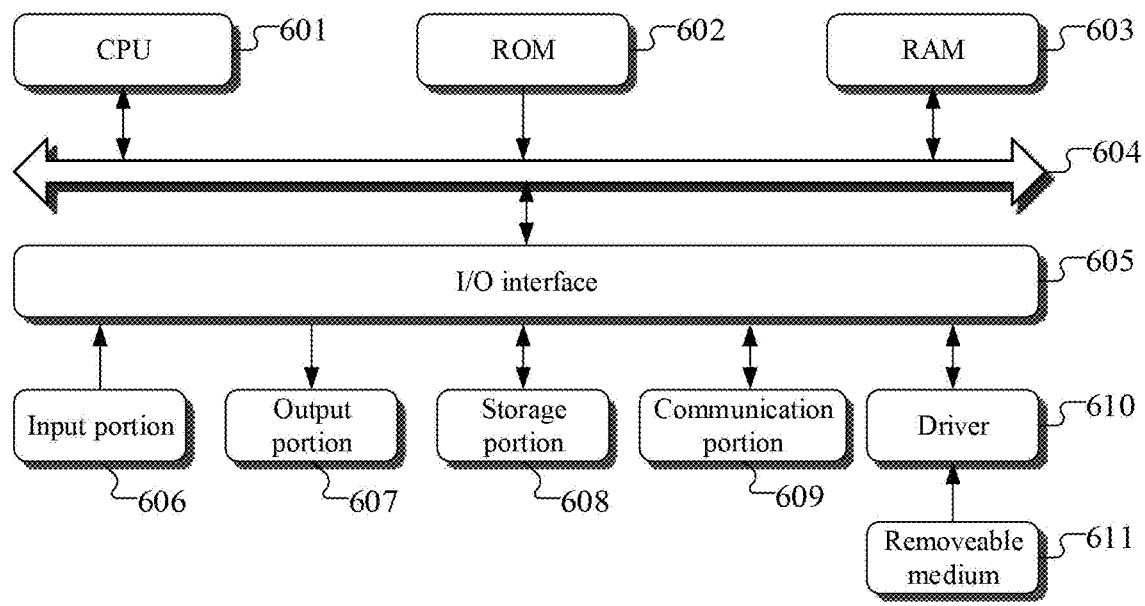
FIG. 6 is a schematic structural diagram of a computer system of an autonomous vehicle suitable for implementing the embodiments of the disclosure.

Referring to FIG. 6, a schematic structural diagram of a computer system 600 adapted to implement the autonomous vehicle of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above-mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a zooming unit, an input unit and a fusion unit, where the names of these units or modules do not in some cases constitute a limitation to such units or modules themselves. For example, the zooming unit may also be described as "a unit for zooming a to-be-processed image acquired by the image acquisition apparatus by at least one preset ratio to obtain at least one zoomed image"

As another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: zoom a to-be-processed image acquired by the image acquisition device by at least one preset ratio to obtain at least one zoomed image; input the at least one zoomed image into a pre-trained convolutional neural network to obtain location information and category information of a traffic light corresponding to each zoomed image of the at least one zoomed image, wherein the convolutional neural network is used for retrieving location information and category information of a traffic light displayed in an image; and analyze the obtained location information and category information to generate at least one candidate traffic light identification result, and fuse the generated candidate traffic light identification result to generate a traffic light identification result corresponding to the to-be-processed image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for identifying a traffic light for an autonomous vehicle, the autonomous vehicle equipped with an image acquisition device and a terminal device, and the method comprising:

zooming, by the terminal device, a to-be-processed image acquired by the image acquisition device by at least one preset ratio to obtain at least one zoomed image;

inputting, by the terminal device, the at least one zoomed image into a pre-trained convolutional neural network to obtain location information and category information of a traffic light corresponding to each zoomed image of the at least one zoomed image, wherein the convolutional neural network is used for retrieving location information and category information of a traffic light displayed in an image; and analyzing, by the terminal device, the obtained location information and category information of the traffic light corresponding to each zoomed image of the at least one zoomed image to generate at least one candidate traffic light identification result, and fusing, by the terminal device, the generated at least one candidate traffic light identification result to generate a traffic light identification result corresponding to the to-be-processed image;

wherein analyzing, by the terminal device, the obtained location information and category information of the traffic light corresponding to each zoomed image of the at least one zoomed image to generate at least one candidate traffic light identification result comprises:

for each zoomed image, retrieving a matrix outputted by the convolutional neural network with the zoomed image as input, the matrix corresponding to a preset category of the traffic light;

comparing, for the matrix corresponding to the preset category of the traffic light, each value in the matrix with a preset threshold to determine whether there is a value greater than the preset threshold in the matrix;

in response to there being a value greater than the preset threshold in the matrix, using the preset category of the traffic light as a target category of the traffic light, and determining a location of an area of the traffic light corresponding to the target category in the to-be-processed image based on the location information outputted by the convolutional neural network; and determining the target category of the traffic light and the location of the area of the traffic light of the target category as a candidate traffic light identification result.

2. The method for identifying a traffic light according to claim 1, wherein the convolutional neural network is obtained through following training:

obtaining the convolution neural network through training using a machine learning method based on a preset image set, a preset regression loss function, a preset classification loss function and a backpropagation algorithm, wherein the regression loss function is used for characterizing a degree of difference between location information outputted by the convolutional neural network and a location of an area of a traffic light in an inputted image, and the classification loss function is used for characterizing a degree of difference between category information outputted by the convolutional neural network and a category of a traffic light in an inputted image.

3. The method for identifying a traffic light according to claim 2, wherein each preset image in the preset image set displays a traffic light, and each preset image in the preset image set carries a location annotation indicating a location of an area of the displayed traffic light and a category annotation indicating a category of the displayed traffic light.

4. The method for identifying a traffic light according to claim 3, wherein the obtaining the convolution neural network through training using a machine learning method based on a preset image set, a preset regression loss function, a preset classification loss function and a backpropagation algorithm comprises:

randomly initializing a parameter of a pre-established initial convolutional neural network using a Gauss distribution;

executing following training: generating a training sample carrying an annotation based on the preset image set, the annotation containing location information and category information of a traffic light; inputting the training sample into the initial convolutional neural network for forward propagation layer by layer, to obtain the location information and the category information outputted by the initial convolutional neural network; determining a value of the preset regression loss function and a value of the preset classification loss function based on the obtained location information and category information, and the location information and the category information contained in the annotation; calculating a gradient of a parameter of each layer of the initial convolutional neural network layer by layer using a chain rule and a backpropagation algorithm, and based on a sum of the value of the regression loss function and the value of the classification loss function; and updating a parameter of the initial convolutional neural network based on the calculated gradient;

determining a number of times of executing the training, and continuing, in response to determining the number of times of the executing the training being less than a first preset number of times, to execute the training of the initial convolutional neural network after updating the parameter; and performing statistics, in response to determining the number of times of the executing the training being equal to the first preset number of times, on a parameter obtained in a last second preset number of times of executing the training, determining a target parameter, and replacing a parameter of the initial convolutional neural network with the target parameter to obtain a trained convolutional neural network, wherein the second preset number of times is less than the first preset number of times.

5. The method for identifying a traffic light according to claim 4, wherein the generating a training sample carrying an annotation based on the preset image set comprises:
- randomly selecting a category in a preset category set and a size in a preset size set;
- retrieving a preset image carrying a category annotation corresponding to the selected category in a preset image set;
- zooming the retrieved preset image to enable a size of an area of a traffic light in the retrieved preset image to be identical to the selected size, and capturing the retrieved preset image with a preset length and a preset width, with the area of the traffic light as the center, to obtain a first captured image;
- determining a zooming ratio of zooming the retrieved preset image, and generating an annotation of the first captured image based on the zooming ratio, and a location annotation and a category annotation carried by the retrieved preset image; and
- generating a random number within a preset numerical range, and determining, in response to determining the retrieved random number being less than a preset value, the retrieved preset image and the first captured image as training samples, wherein the preset numerical range comprises the preset value.

6. The method for identifying a traffic light according to claim 5, wherein the generating a training sample carrying an annotation based on the preset image set further comprises:
- randomly capturing, in response to determining the random number being greater than or equal to the preset value, the retrieved preset image with the preset length and the preset width, to obtain a second captured image, and determining the retrieved preset image and the second captured image as training samples, wherein the second captured image carries a category annotation indicating the category being a background category.

7. The method for identifying a traffic light according to claim 5, wherein the category set comprises: a background category set, a daytime red light category set, a daytime yellow light category set, a daytime green light category set, a daytime black light category set, a night red light category set, a night yellow light category set, and a night green light category set.

8. The method for identifying a traffic light according to claim 5, wherein the preset size set comprises a plurality of sizes with heights respectively being different pixels, and the convolutional neural network is a fully convolutional network.

9. An apparatus for identifying a traffic light for an autonomous vehicle, the autonomous vehicle equipped with an image acquisition device, and the apparatus comprising:
- at least one processor; and a memory storing instructions, wherein the at least one processor is configured to execute the instructions to:
- zoom a to-be-processed image acquired by the image acquisition device by at least one preset ratio to obtain at least one zoomed image;
- input the at least one zoomed image into a pre-trained convolutional neural network to obtain location information and category information of a traffic light corresponding to each zoomed image of the at least one zoomed image, wherein the convolutional neural network is used for retrieving location information and category information of a traffic light displayed in an image, and the category information comprises a probability that the traffic light corresponds to each preset category; and
- analyze the obtained location information and category information of the traffic light corresponding to each zoomed image of the at least one zoomed image to generate at least one candidate traffic light identification result, and fuse the generated at least one candidate traffic light identification result to generate a traffic light identification result corresponding to the to-be-processed image;
- wherein analyzing the obtained location information and category information of the traffic light corresponding to each zoomed image of the at least one zoomed image to generate at least one candidate traffic light identification result comprises:
- for each zoomed image, retrieving a matrix outputted by the convolutional neural network with the zoomed image as input, the matrix corresponding to a preset category of the traffic light;
- comparing, for the matrix corresponding to the preset category of the traffic light, each value in the matrix with a preset threshold to determine whether there is a value greater than the preset threshold in the matrix;
- in response to there being a value greater than the preset threshold in the matrix, using the preset category of the traffic light as a target category of the traffic light, and determining a location of an area of the traffic light corresponding to the target category in the to-be-processed image based on the location information outputted by the convolutional neural network; and
- determining the target category of the traffic light and the location of the area of the traffic light of the target category as a candidate traffic light identification result.

10. The apparatus for identifying a traffic light according to claim 9, wherein the convolutional neural network is obtained through following training:
- obtaining the convolution neural network through training using a machine learning method based on a preset image set, a preset regression loss function, a preset classification loss function and a backpropagation algorithm, wherein the regression loss function is used for characterizing a degree of difference between location information outputted by the convolutional neural network and a location of an area of a traffic light in an inputted image, and the classification loss function is used for characterizing a degree of difference between category information outputted by the convolutional neural network and a category of a traffic light in an inputted image.

11. The apparatus for identifying a traffic light according to claim 10, wherein each preset image in the preset image set displays a traffic light, and each preset image in the preset image set carries a location annotation indicating a location of an area of the displayed traffic light and a category annotation indicating a category of the displayed traffic light.

12. The apparatus for identifying a traffic light according to claim 11, wherein the obtaining the convolution neural network through training using a machine learning method based on a preset image set, a preset regression loss function, a preset classification loss function and a backpropagation algorithm comprises:
- randomly initializing a parameter of a pre-established initial convolutional neural network using a Gauss distribution;
- executing following training: generating a training sample carrying an annotation based on the preset image set, the annotation containing location information and category information of a traffic light; inputting the training sample into the initial convolutional neural network for forward propagation layer by layer, to obtain the location information and the category information outputted by the initial convolutional neural network; determining a value of the preset regression loss function and a value of the preset classification loss function based on the obtained location information and category information, and the location information and the category information contained in the annotation; calculating a gradient of a parameter of each layer of the initial convolutional neural network layer by layer using a chain rule and a backpropagation algorithm, and based on a sum of the value of the regression loss function and the value of the classification loss function; and updating a parameter of the initial convolutional neural network based on the calculated gradient;

determining a number of times of executing the training, and continuing, in response to determining the number of times of the executing the training being less than a first preset number of times, to execute the training of the initial convolutional neural network after updating the parameter; and performing statistics, in response to determining the number of times of the executing the training being equal to the first preset number of times, on a parameter obtained in a last second preset number of times of executing the training, determining a target parameter, and replacing a parameter of the initial convolutional neural network with the target parameter to obtain a trained convolutional neural network, wherein the second preset number of times is less than the first preset number of times.

13. The apparatus for identifying a traffic light according to claim 12, wherein the generating a training sample carrying an annotation based on the preset image set comprises:

randomly selecting a category in a preset category set and a size in a preset size set;

retrieving a preset image carrying a category annotation corresponding to the selected category in a preset image set;

zooming the retrieved preset image to enable a size of an area of a traffic light in the retrieved preset image to be identical to the selected size, and capturing the retrieved preset image with a preset length and a preset width, with the area of the traffic light as the center, to obtain a first captured image;

determining a zooming ratio of zooming the retrieved preset image, and generating an annotation of the first captured image based on the zooming ratio, and a location annotation and a category annotation carried by the retrieved preset image; and generating a random number within a preset numerical range, and determining, in response to determining the retrieved random number being less than a preset value, the retrieved preset image and the first captured image as training samples, wherein the preset numerical range comprises the preset value.

14. The apparatus for identifying a traffic light according to claim 13, wherein the generating a training sample carrying an annotation based on the preset image set further comprises:

randomly capturing, in response to determining the random number being greater than or equal to the preset value, the retrieved preset image with the preset length and the preset width, to obtain a second captured image, and determining the retrieved preset image and the second captured image as training samples, wherein the second captured image carries a category annotation indicating the category being a background category.

15. The apparatus for identifying a traffic light according to claim 13, wherein the category set comprises: a background category set, a daytime red light category set, a daytime yellow light category set, a daytime green light category set, a daytime black light category set, a night red light category set, a night yellow light category set, and a night green light category set.

16. The apparatus for identifying a traffic light according to claim 13, wherein the preset size set comprises a plurality of sizes with heights respectively being different pixels, and the convolutional neural network is a fully convolutional network.

17. A non-transitory computer readable storage medium, storing a computer program therein, wherein the computer program, when executed by the processor, cause the processor to perform operations to:

zoom a to-be-processed image acquired by the image acquisition device by at least one preset ratio to obtain at least one zoomed image;

input the at least one zoomed image into a pre-trained convolutional neural network to obtain location information and category information of a traffic light corresponding to each zoomed image of the at least one zoomed image, wherein the convolutional neural network is used for retrieving location information and category information of a traffic light displayed in an image, and the category information comprises a probability that the traffic light corresponds to each preset category; and analyze the obtained location information and category information of the traffic light corresponding to each zoomed image of the at least one zoomed image to generate at least one candidate traffic light identification result, and fuse the generated at least one candidate traffic light identification result to generate a traffic light identification result corresponding to the to-be-processed image;

wherein analyzing, by the terminal device, the obtained location information and category information of the traffic light corresponding to each zoomed image of the at least one zoomed image to generate at least one candidate traffic light identification result comprises:

for each zoomed image, retrieving a matrix outputted by the convolutional neural network with the zoomed image as input, the matrix corresponding to a preset category of the traffic light;

comparing, for the matrix corresponding to the preset category of the traffic light, each value in the matrix with a preset threshold to determine whether there is a value greater than the preset threshold in the matrix;

in response to there being a value greater than the preset threshold in the matrix, using the preset category of the traffic light as a target category of the traffic light, and determining a location of an area of the traffic light corresponding to the target category in the to-be-processed image based on the location information outputted by the convolutional neural network; and determining the target category of the traffic light and the location of the area of the traffic light of the target category as a candidate traffic light identification result.

\* \* \* \* \*